Dec. 7, 1954  O. H. LANGFORD  2,696,142
REMOTE CONTROL REARVIEW MIRROR FOR
TRUCKS, TRAILERS, AND
OTHER VEHICLES
Filed Feb. 11, 1952  2 Sheets-Sheet 1
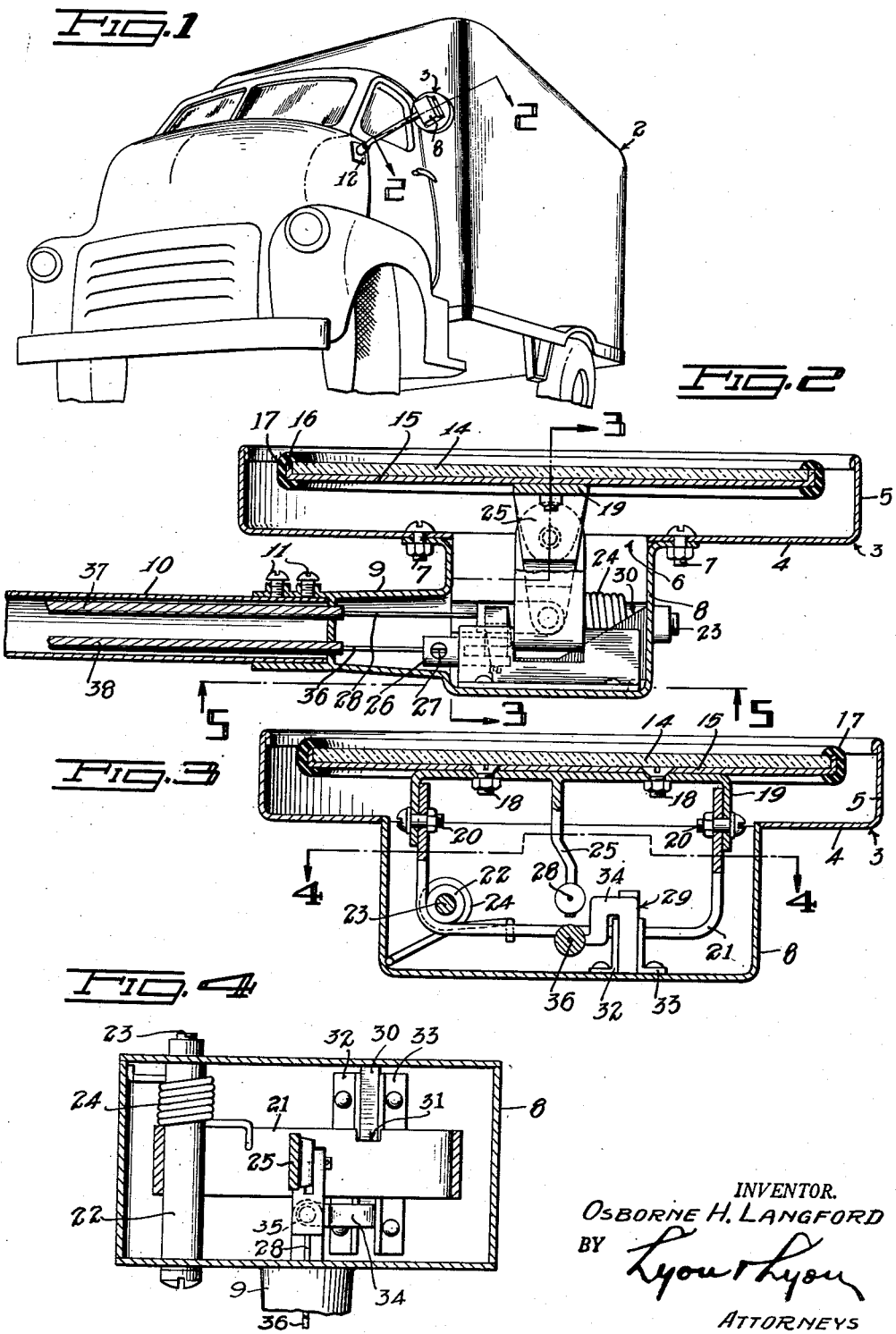
INVENTOR.
OSBORNE H. LANGFORD
BY
Lyon & Lyon
ATTORNEYS

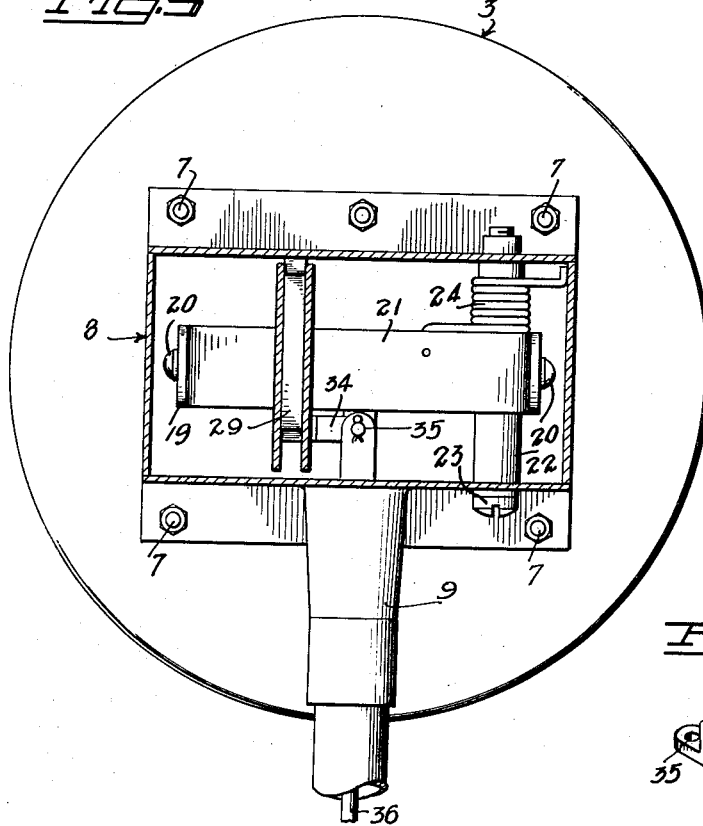
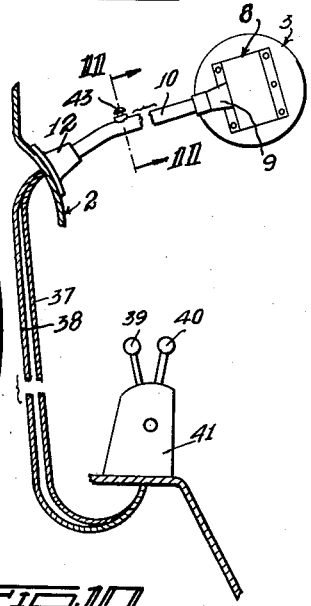
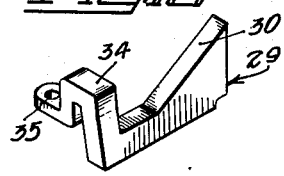
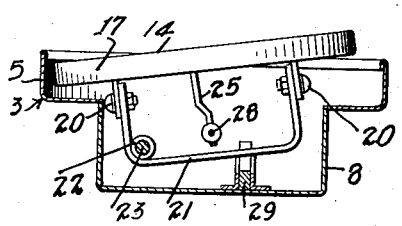
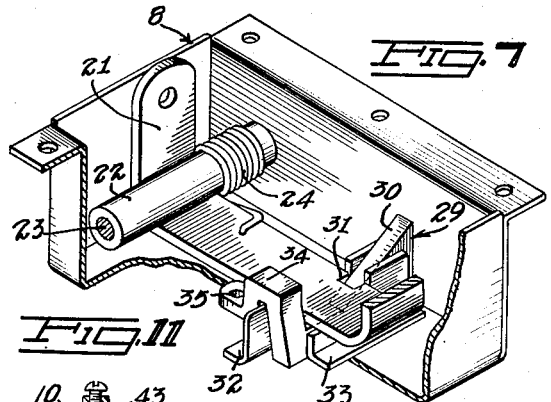
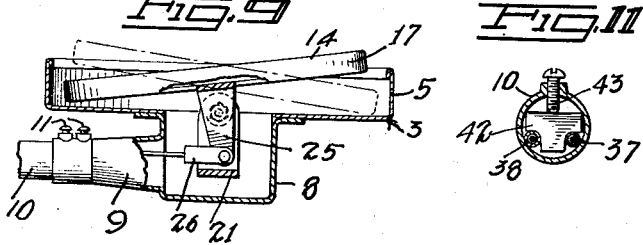
INVENTOR.
OSBORNE H. LANGFORD
BY
Lyon & Lyon
ATTORNEYS

United States Patent Office 2,696,142
Patented Dec. 7, 1954

2,696,142

REMOTE CONTROL REARVIEW MIRROR FOR TRUCKS, TRAILERS, AND OTHER VEHICLES

Osborne H. Langford, Los Angeles, Calif.

Application February 11, 1952, Serial No. 271,000

4 Claims. (Cl. 88—93)

This invention relates to an adjustable mirror and remote control therefor, which mirror is intended to be utilized on trucks, trailers, etc.

The driver of a large truck, particularly a truck having a large enclosed body, is dependent solely on the use of mirrors to determine whether it is safe to maneuver from one lane of traffic to the other. This is particularly true where the driver, having maneuvered the truck into the middle of the road is desirous of knowing if the right lane is clear so he may turn to the right, a situation which is greatly aggravated if the truck is also pulling a large trailer. The drivers today are having great difficulty because of the fact that the mirrors used are adjustable only from outside of the truck and are continually out of their proper adjusted position.

A general object of this invention is to provide an adjustable mirror, together with a remote control therefor, which is useful for trucks by means of which the operator of the truck may readily maneuver the mirror to any desired position.

A further object of the present invention is to provide a type of adjustable mirror and remote control therefor which will allow the mirror to be located at considerable distance from the source of operation of the mirror.

Various further objects and advantages of the invention will be apparent from the following description of a preferred example of the invention, the description being given in connection with the accompanying drawings in which Figure 1 is a perspective view of a truck equipped with the remote control mirror of the present invention;

Figure 2 is a section substantially on the line 2—2 of Figure 1;

Figure 3 is a section substantially on the line 3—3 of Figure 2;

Figure 4 is a section substantially on the line 4—4 of Figure 3;

Figure 5 is a section substantially on line 5—5 of Figure 2 shown in a vertical position;

Figure 6 is a schematic view of the complete device;

Figure 7 is a fragmentary perspective view of a box and associated elements;

Figure 8 is a diagrammatic view similar to Figure 3 but with the apparatus in a different adjusted position;

Figure 9 is a diagrammatic view at right angles to Figure 8 showing a different adjusted position of the mirror;

Figure 10 is a perspective view of the cam; and

Figure 11 is a section taken on line 11—11 of Figure 6.

Referring to the drawings, 2 indicates a truck in which the remote control mirror of the present invention is mounted. While in the drawings there is visible only the mirror on the left side of the truck it is a feature of particular importance to the present invention that the type of apparatus herein disclosed is also useful for controlling from the same position a mirror located on the right side of the truck.

The mirror of the present invention comprises a substantially circular shield 3 having the baseplate 4 and rim 5. The baseplate 4 has an opening 6 and to this baseplate 4 of the shield is bolted, as indicated at 7, a box-like casing 8. The casing 8 is provided with an extension 9 which receives a tube 10. Setscrews 11 are shown for fastening the tube 10 to the extension 9. The tube 10 extends to a bracket 12 which is to be mounted on the side of the vehicle which serves as a supporting arm for holding the mirror of the present invention at a suitable position out to the side of the mounting truck 2.

A mirror 14, which may be of any usual or preferred type, such as silver-backed glass, is shown mounted within the holding plate 15 which is provided with a rim 16 equal to the thickness of the glass 14. A rubber rim 17 is provided serving as a buffer for anything which might strike the mirror and also as an additional means for retaining the mirror within the holder.

The holder is holding, as indicated at 18, to a U-shaped bracket 19, the ends of which are pivoted as indicated at 20, to a U-shaped mounting member 21, which is mainly disposed within the box-like casing 8. The mounting member 21 is rigidly secured to a shaft 22 which is on an axis perpendicular to the axis of the axis of the pivot 20 and mounted upon a rod 23 supported by the sides of the casing 8. A coiled spring 24 is provided which forms means for yieldingly urging the mounting member 21 clockwise as viewed in Figure 3 having one end contacting the casing and the other end contacting the mounting member 21 as shown.

For rotating the mirror about the axis of the pivots 20 there is provided an arm 25 on the bracket 19 which arm pivotally mounts a wire clamp 26 provided with means such as the setscrews 27 for clamping the end of a steel cable 28. For rotating the mirror relative to the axis of the shaft 22 there is provided a cam 29. The cam 29 in operation is provided with the tapered face 30 which engages in a slot 31 in the mounting member 21 so that when the cam member is drawn to the left, as indicated in Figure 7, the mounting member 21 will be pivoted counter-clockwise relative to the axis of the shaft 22 returning by force of spring 24 as the force on the cam 29 is released.

To guide the cam 29 in its reciprocal movements a pair of angle plates 32, 33 are provided fastened to the face of the box-casing 8 and the body of the cam 29 is slidable between these angles 32, 33 but is provided with a portion 34 which hooks over one of the angles 32, 33, and there is provided with an opening 35 for the reception of one end of the steel cable 36.

The steel cables 28 and 36 are covered throughout most of their length by a suitable covering material, such as indicated at 37, 38, such as a rubber composition, and extend, in practice, to control handles 39, 40 pivoted on a control box 41 which is mounted within the cabin of the truck 2 at any suitable position. The steel cables are connected by any usual or preferred manner to the handles 39, 40 so that as they are pivoted in one direction the cables are drawn in one direction and as shifted in the other direction are released providing a separate adjustment for each handle on one of the pivotal movements of the mirror 14.

It will thus be seen that by the apparatus of the present invention the mirror 14 is pivotally mounted for separate movement about two axes of rotation at right angles to each other thus providing for a universal mounting of the mirror and permitting the mirror to be adjusted in any desired adjusted position. In practice, of course, a portion of the cables 28 and 36 between the bracket 12 and the box 41 should pass through some guiding tube or over some pulleys (not shown).

The mirrors of the present invention allow the driver of the truck in a very simple manner from his regular driving position to adjust the mirrors as desired. To lock the mirror in the adjusted position there is indicated a locking bar 42 (Figures 6 and 11) within the tube 10 which is movable against the cables 28 and 30 by a locking screw 43.

While the particular form of remote control for mirrors herein described is well adapted to carry out the objects of the present invention this invention is of the scope set forth in the appended claims.

I claim:

1. A remote control mirror which comprises, a mirror, mirror housing means having pivotal mounting means therein for mounting the mirror for rotation relative to two axes at right angles to permit a universal movement of said mirror, two cables connected to the pivotal mounting means, each cable being adapted for connection to the pivoting means of the mirror about one of the axes, and a hollow supporting member for the mirror housing means adapted to support the mirror at an extended position from the side of the vehicle, said cables extending through said hollow supporting member, the pivotal means for movement of the mirror about one of the axes comprising a member yieldingly urged in one direction and a reciprocating cam attached to one of the cables contacting said member to pivot the member in the opposite direction.

2. A remote control mirror for a vehicle which comprises, a shield, a housing attached to said shield, a tube attached to said housing and extending to a bracket by which the mirror may be mounted upon a vehicle, a mirror positioned within said shield, pivotal means for said mirror within said housing, including means for pivoting the mirror about one axis of rotation and means for pivoting the mirror about another axis of rotation at substantially a right angle to the first axis of rotation so as to provide a universal movement of said mirror, and a pair of cables extending through said tubing and respectively connected to said pivotal means for each effecting a pivoting of the mirror about one of its axes of rotation.

3. A remote control mirror for a vehicle which comprises, a shield, a housing attached to said shield, a tube attached to said housing and extending to a bracket by which the mirror may be mounted upon a vehicle, a mirror positioned within said shield and pivotal means for said mirror within said housing comprising means for pivoting the mirror about two axes of rotation at substantially right angles so as to provide a universal movement of said mirror, and a pair of cables extending through said tubing and connected to said mounting means for each effecting a pivoting of the mirror about one of its axes of rotation, the mounting means including a member yieldingly pivoted in one direction about one of the axes of the mirror and a cam contacting said member attached to one of said cables which, on movement, urges said member in the opposite pivotal direction.

4. A remote control mirror for a vehicle which comprises, a shield, a housing attached to said shield, a member attached to said housing and extending to a bracket by which the mirror may be mounted upon a vehicle, a mirror positioned within said shield, pivotal means for said mirror within said housing, said pivotal means including means for pivoting the mirror about one axis of rotation, means for pivoting the mirror about another axis of rotation at a substantially right angle to the first axis of rotation so as to provide a universal movement of said mirror, and a pair of cables extending from the bracket to said housing and respectively connected to said pivotal means each effecting a pivoting of the mirror about one of its axes of rotation.

References Cited in the file of this patent

UNITED STATES PATENTS

| Number | Name | Date |
|---|---|---|
| 1,444,896 | Young | Feb. 13, 1923 |
| 1,913,874 | Folberth et al. | June 13, 1933 |
| 2,148,964 | Shepler | Feb. 28, 1939 |
| 2,326,316 | Allen | Aug. 10, 1943 |
| 2,456,362 | Aves | Dec. 14, 1948 |
| 2,504,386 | Brady et al. | Apr. 18, 1950 |
| 2,504,387 | Bruellage | Apr. 18, 1950 |
| 2,527,507 | Hatten | Oct. 31, 1950 |